June 9, 1953 H. STOVER 2,641,709

FREQUENCY CORRECTION DEVICE

Filed Feb. 13, 1952

INVENTOR.
HARRIS STOVER
BY
Morris Moody
ATTORNEY

Patented June 9, 1953

2,641,709

UNITED STATES PATENT OFFICE 2,641,709

FREQUENCY CORRECTION DEVICE

Harris Stover, Cedar Rapids, Iowa, assignor to Collins Radio Company, Cedar Rapids, Iowa, a corporation of Iowa Application February 13, 1952, Serial No. 271,369

5 Claims. (Cl. 250—40)

This invention relates in general to a frequency correction device and in particular to apparatus for compensating the tuning characteristic of an inductor.

It is oftentimes desirable in electronics to obtain a frequency versus shaft position characteristic which has a certain shape, as for example, linear. However, most tuning elements do not have an inherently linear characteristic.

It is an object of this invention therefore, to provide a frequency correction device which will compensate for non-linearity in a tuning element.

Another object of this invention is to provide an improved tuning device.

Further objects, features and advantages of this invention will become apparent from the following description and claims when read in view of the drawings, in which:

Figure 1:
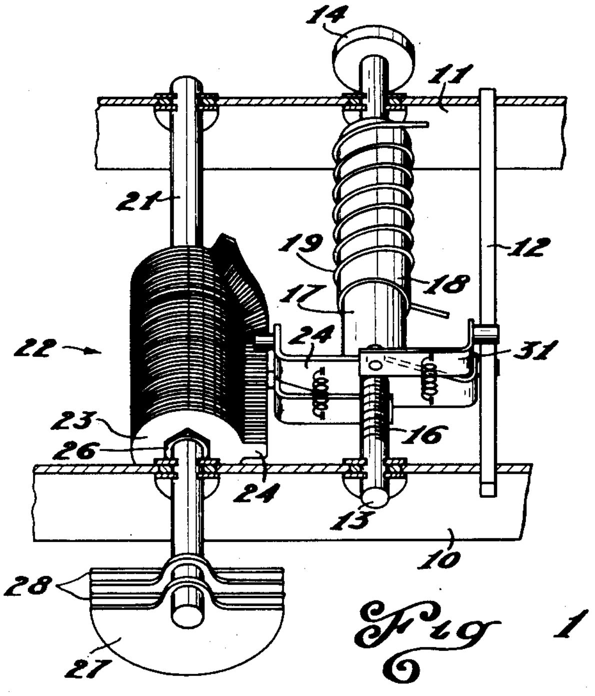
Figure 1 is a top perspective view of the tuner of this invention.

Figure 1 illustrates a pair of end plates 10 and 11. A guide member 12 is supported between the end plates 10 and 11. A shaft 13 is rotatably supported between the end plates and has a knob 14 at one end thereof.

The shaft 13 has a threaded portion 16 which threadedly receives a tuning slug 17 thereon. A coil form 18 is attached to the plate 11 and has a coil of wire 19 formed about it. The coil form 18 is made of electrical insulating material. Rotation of the knob 14 moves the slug 17 relative to the coil 19 and thus varies the inductance.

A second shaft 21 is rotatably supported between the plates 10 and 11 and has mounted thereon a disc assembly which comprises a number of individual discs 23 each of which has an extending tab 24. The discs 23 are clamped between nuts 26 which may be loosened to adjust their angular position.

A controlled element, as for example, a condenser has its rotor plates 27 connected to the shaft 21 so that rotation of the shaft 21 varies the position of the rotor 27 relative to the stator 28.

Figure 2:
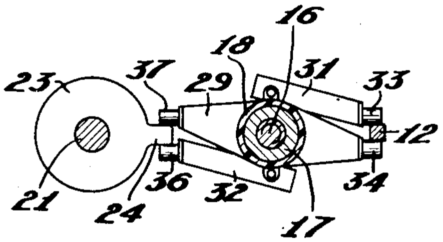
Figure 2 is a sectional view of the tuning mechanism.

Attached to the end of slug 17 is a transverse follower 29 and a pair of pivoted followers 31 and 32. As best shown in Figure 2 the follower 31 is spring biased toward one end of the member 29 and the bar 12 is engaged between rollers 33 and 34 mounted, respectively, to the members 31 and 29. The tabs 24 are clamped between the follower 32 and the other end of the member 29 by rollers 36 and 37, respectively. Spring means bias the rollers 33 and 34, and 36 and 37 toward each other.

Figure 3:
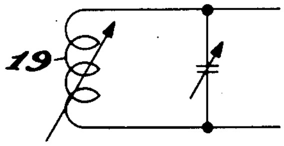
Figure 3 is a schematic view.

In operation, it is desired to correct the rotation of shaft 13 versus frequency characteristic of the inductor 19, and the condenser may be connected electrically as shown in Figure 3. The nut 26 may be loosened and the tabs 24 adjusted so that the rotor plates 27 will compensate for any undesired deviations of the inductor 19. Since the positions of the tabs 24 govern the rotation of the rotor plates 27, practically any desired correction may be made.

Thus it is seen that this invention provides a convenient and accurate manner for adjusting the resonant frequency of a tuned device.

Although this invention has been described with respect to particular embodiments thereof, it is not to be so limited as changes and modifications may be made therein which are within the full intended scope of the invention as defined by the appended claims.

I claim:

1. A motion translating device comprising a pair of end plates, a guide member supported between said end plates, a first shaft rotatably supported between said end plates and formed with a threaded portion between, a coil form mounted to one of said end plates about said first shaft, a coil of wire wound about said coil form, a tuning slug threadedly connected to said first shaft and movable within the confines of said coil form, a transverse follower extending from one end of the tuning slug and engageable with said guide, a second shaft rotatably supported between said plates adjacent the first shaft, a plurality of discs mounted on said second shaft and adjustable angularly about the shaft, a tab extending from each of said discs, and a second transverse follower extending from said tuning slug and engageable with said tabs.

2. Means for controlling the relative rotation of a pair of shafts comprising, a pair of end plates with said shafts rotatably supported therebetween, a guide member mounted adjacent one of said shafts, a threaded cylindrical member threadedly received on one of said shafts between the end plates, a disc assembly mounted on the other shaft with each disc having an extending tab, a pair of cam followers extending from said cylindrical member with one of said cam followers engageable with said guide member, and the other cam follower engageable with the tabs of said disc assembly.

3. A tuning assembly comprising a pair of shafts rotatably supported between a pair of end plates, a guide member supported between said end plates adjacent one of said shafts, a tuning slug threadedly connected to one of said shafts, a pair of transverse followers extending from said tuning slug with one of said followers engageable with said guide member, a disc assembly mounted on the other shaft, a tab extending from each disc of said assembly, the discs of said assembly adjustable angularly with respect to the shaft, and the second cam follower engageable with the tabs of said disc assembly.

4. A shaft control means comprising a pair of end plates, a pair of shafts rotatably supported between said end plates, a guide supported between said end plates, a cylindrical slug mounted concentric on said first shaft and threadedly connected thereto, a first pair of pivoted followers extending from said tuning slug and engageable with opposite sides of said guide, a disc assembly mounted on the second shaft, a tab extending from each of said discs, said discs being adjustable angularly with respect to said second shaft, and a second pair of pivoted followers extending from said tuning slug and engageable with opposite sides of said tabs.

5. Means for controlling the movement of a pair of shafts in a non-linear manner comprising a pair of end plates with said shafts rotatably supported between, a guide member mount to said end plates adjacent one of said shafts, a cylindrical member threadedly received on one of said shafts between the end plates, a first pair of pivoted followers extending from said cylindrical member and engageable with opposite sides of said guide member, a disc assembly mounted on the other shaft, a tab extending from each of said discs, means for adjusting the angular position of said discs, and a second pair of pivoted followers attached to said cylindrical member and engageable with opposite sides of said tabs.

HARRIS STOVER.

No references cited.